Feb. 10, 1925.
1,525,436
L. BEEMAN
WHEEL
Filed May 23, 1921
2 Sheets-Sheet 2

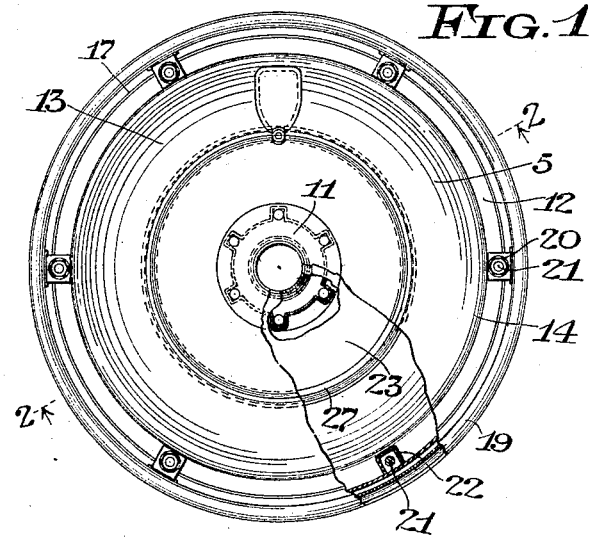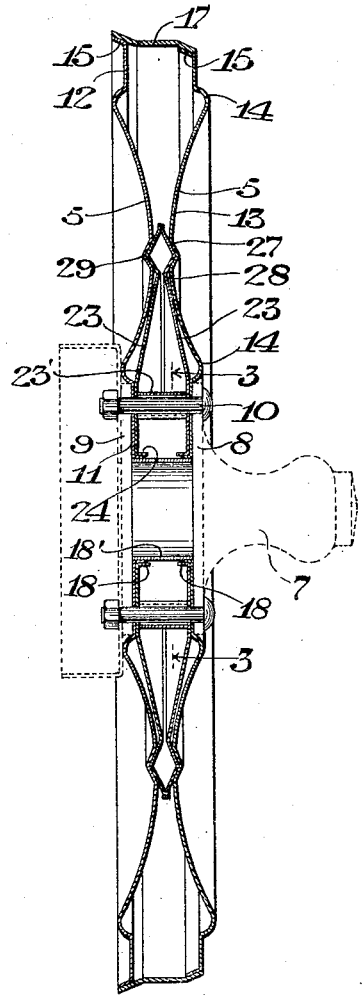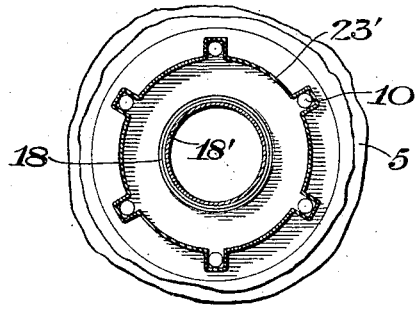

WITNESSES
INVENTOR
Lyle Beeman
By R. S. Caldwell
ATTORNEY

Patented Feb. 10, 1925.

1,525,436

UNITED STATES PATENT OFFICE.

LYLE BEEMAN, OF MILWAUKEE, WISCONSIN.

WHEEL.

Application filed May 23, 1921. Serial No. 471,807.

*To all whom it may concern:*

Be it known that I, LYLE BEEMAN, a citizen of the United States, and resident of Milwaukee, in the county of Milwaukee and State of Wisconsin, have invented new and useful Improvements in Wheels, of which the following is a description, reference being had to the accompanying drawings, which are a part of this specification.

The invention relates to pressed metal wheels.

One of the objects of the invention is to provide a wheel of the metal disk type having outer disks forming the web of the wheel and reinforcing disks secured to the hub and disposed between the outer disks to strengthen those parts of the web subjected to the severest strains.

The invention further consists in the several features hereinafter set forth and more particularly defined by claims at the conclusion hereof.

Figure 4:
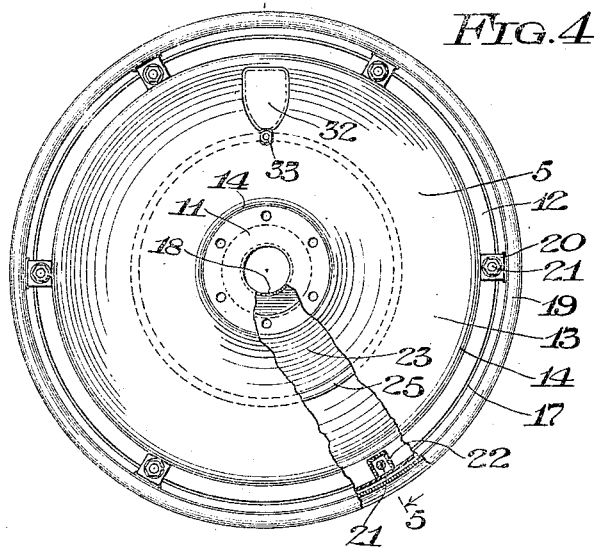
Figure 7:
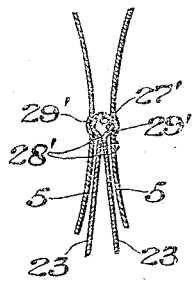
Figure 5:
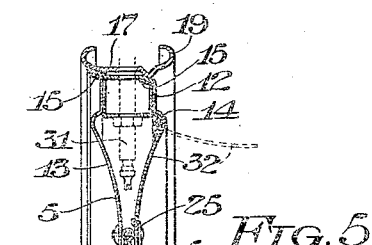
Figure 6:
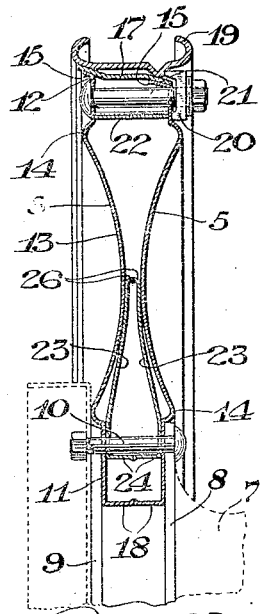

In the drawings: Fig. 1 is a side elevation view of a wheel embodying the invention, parts being broken away and parts being shown in section; Fig. 2 is a section taken on the line 2—2 of Fig. 1; Fig. 3 is a detail sectional view taken on the line 3—3 of Fig. 2; Fig. 4 is a side elevation view of a modified form of internal bracing; Fig. 5 is a section taken on the line 5—5 of Fig. 4; Fig. 6 is a modified form of internal bracing; Fig. 7 is a detail sectional view of a modified form of joint between the disks from that shown in Fig. 5.

Complementary metal disks 5 are secured to the wheel hub 7, said disks having a hub portion, web portion and rim portion. The hub 7 of the wheel is of usual construction, having flanges 8 and 9 through which bolts 10 pass, said bolts serving to clamp the disk wheel to the hub either of the front wheel or the rear wheel. The hub 7 is of the type used on wooden wheels where the flanges are spaced apart, the thickness of the wooden spokes, so that it is not necessary to provide a special hub construction.

Each of the disks 5 has an annular hub portion 11 and an annular rim portion 12 parallel to the plane of rotation, a concavo-convex intermediate or web portion 13 and curved portions 14 connecting the portion 13 with the portions 11 and 12. These curved portions 14 serve to reinforce the web portions of the disks and increase the bearing area of the disks at the hub and rim portions to better resist the loads or strains to which the disks are subjected.

The disks 5 have peripheral flanges 15 secured by welding, brazing or other well known methods to the usual wheel rim 17. The hub portions 11 of the disks have inwardly extending annular flanges 18 secured to the hub ring 18', in Figs. 1 to 3 and in Figs. 4 to 6, secured together by welding, brazing or other well known methods, and are here shown with a butt joint, but they may be secured with a lap joint.

The usual type of demountable rim 19 is secured to the rim 17 by clamping blocks 20 held in clamping engagement with the rim 19 by bolts 21 passing through the rim portions 12 of the disks. Channel blocks 22 between the disks where the bolts pass through serve as reinforcement for the rim portion.

The web portions of the disks are spaced apart, and to strengthen the web a pair of complementary metal converging disks 23 are interposed between them and extend from the hub to the intermediate portion of the web. The disks 23 are conically curved and have inwardly extending annular flanges 24 secured to the flanges 18, in Figs. 1 to 3 and in Figs. 4 to 6, secured together by welding, brazing or other well known methods, and are here shown with a butt joint, but they may be secured with a lap joint, said flanges in the construction shown in Figs. 4 to 6 forming a spreader ring to reinforce the hub where the bolts 10 pass through the disks 5. In Figs. 1 to 3 a separate spreader ring 23 is provided with channel-shaped projections through which the bolts 10 pass, said ring being welded to the disks 23 and providing a very strong reinforcement.

In Fig. 2 the outer edges of the disks 23 are secured together to form a diamond-shaped bead or rim portion 27, with the lower edges slightly spaced apart to give spring action, and the sides of this bead interlock with the disks 5 at the intermediate portions of the webs by seating in annular flat-sided recesses 29 formed in the disks 5. In Fig. 5 the outer ends of the disks 23 are secured together to form a bead or hollow ring portion 25 contacting with the disks 5. In Fig. 6 the outer edges of the disks 23 are curved inwardly at the edges 26 and secured together, and the sides of the disks 23 where they contact with the disks 5 are preferably welded or brazed thereto. In Fig. 7 the disks 23 are secured together to form a bead or ring portion 27' with the lower edges 28' slightly spaced apart to give a spring action and interlock with the disks 5 at the intermediate portions of the webs by seating in annular recesses 29' formed in the disks 5. The ring portion 25 shown in Fig. 2 is preferably in free contact with the disks 5 so as to permit a relative movement between the disks 5 and 23, though it may be welded or brazed to the disks 5. In each case the disks 23 prevent the disks 5 from buckling under heavy stress.

One of the disks has an opening 30 to provide access to the tire valve 31, and a cover cap 32 is hinged at one side of this opening and secured in closed position by a bolt 33.

I desire it to be understood that this invention is not to be limited to any specific form or arrangement of parts except in so far as such limitations are specified in the claims.

What I claim as my invention is:

1. In a disk wheel, the combination of a pair of metal disks having hub portions, rim portions and concavo-convex spaced web portions, and a pair of conical metal disks secured together and contacting with said web portions at a distance from the hub but spaced from said web portions adjacent the hub.

2. In a disk wheel, the combination of a pair of sheet metal disks having concavo-convex web portions approaching each other at intermediate parts but spaced out of contact, and a pair of conical metal disks secured together and extending from the hub between the first-named disks, said conical disks having beaded rim portions contacting with and spacing the web portions at their nearest intermediate parts.

3. In a disk wheel, the combination of a pair of spaced metal disks having hub portions, rim portions and concavo-convex spaced web portions, a pair of conical reinforcing disks between the first named disks and having interlocking connection with the intermediate parts of said web portions, and a spreader ring at the hub portion between said reinforcing disks provided with channel-shaped projections through which the hub bolts pass.

4. In a disk wheel, the combination of a pair of spaced sheet metal disks having hub portions, rim portions and concavo-convex web portions spaced out of contact, a pair of reinforcing disks between the first named disks and engaging said web portions at their nearest intermediate parts, both pairs of disks having inwardly extending hub flanges, and a hub ring secured to the hub flanges of the first named disks.

5. In a disk wheel, the combination of a pair of metal disks having hub portions, rim portions and concavo-convex spaced web portions connected by inwardly extending curved portions with said rim and hub portions, and a pair of conical metal disks secured together and contacting with said web portions but spaced from said inwardly curved portions adjacent the hub.

In testimony whereof I affix my signature.

LYLE BEEMAN.